United States Patent
Hayakawa et al.

(10) Patent No.: US 8,302,755 B2
(45) Date of Patent: Nov. 6, 2012

(54) HYDRAULIC MECHANISM FOR VEHICLE

(75) Inventors: Koshi Hayakawa, Saitama (JP); Kanau Iwashita, Saitama (JP); Yoshihisa Ieda, Saitama (JP); Katsumi Sahoda, Saitama (JP); Akihiko Tomoda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1139 days.

(21) Appl. No.: 12/179,319

(22) Filed: Jul. 24, 2008

(65) Prior Publication Data

US 2009/0057090 A1 Mar. 5, 2009

(30) Foreign Application Priority Data

Aug. 27, 2007 (JP) .................................. 2007-220435

(51) Int. Cl.
*F16D 25/08* (2006.01)
*F16D 48/06* (2006.01)

(52) U.S. Cl. ..... 192/83; 192/85.5; 192/85.59; 192/85.6; 60/579

(58) Field of Classification Search .................... 192/83, 192/85.5, 85.59, 85.6, 84.6; 60/567, 579, 60/545, 593, 594; 188/345; 303/114.2
See application file for complete search history.

(56) References Cited

U.S. PATENT DOCUMENTS

| | | | | |
|---|---|---|---|---|
| 2,243,385 A * | 5/1941 | Levy | ................................ | 60/573 |
| 2,414,302 A * | 1/1947 | Hebel | .............................. | 60/567 |
| 2,501,005 A * | 3/1950 | Rockwell | ................... | 192/85.51 |
| 4,241,584 A * | 12/1980 | Jaecks | .............................. | 60/580 |
| 5,839,561 A | 11/1998 | Koda et al. | | |
| 6,170,624 B1 * | 1/2001 | Arai et al. | ..................... | 192/3.58 |
| 7,591,358 B2 * | 9/2009 | Pick | ................................ | 192/83 |
| 7,690,474 B2 * | 4/2010 | Iwashita et al. | .................. | 180/374 |
| 7,857,113 B2 * | 12/2010 | Villata et al. | .................. | 192/85.6 |
| 8,002,099 B2 * | 8/2011 | Hayakawa et al. | ............. | 192/83 |
| 8,162,121 B2 * | 4/2012 | Hayakawa et al. | ............. | 192/83 |
| 8,201,677 B2 * | 6/2012 | Hayakawa et al. | ............. | 192/83 |
| 2002/0096415 A1 * | 7/2002 | Inoue | ............................... | 192/83 |
| 2002/0148699 A1 * | 10/2002 | Mack et al. | ..................... | 192/83 |
| 2009/0266671 A1 * | 10/2009 | Hayakawa et al. | ......... | 192/85 R |

FOREIGN PATENT DOCUMENTS

| FR | 2862114 A1 | 5/2005 |
|---|---|---|
| JP | 9-254771 A | 9/1997 |

* cited by examiner

*Primary Examiner* — David D Le
*Assistant Examiner* — Terry Chau
(74) *Attorney, Agent, or Firm* — Birch, Stewart, Kolasch & Birch, LLP

(57) ABSTRACT

A clutch hydraulic mechanism wherein the positional relationship between two cylinders is not varied, and a compact structure can be achieved. A see-saw member for transmitting motive power is provided between a second release cylinder and a first master cylinder and the first master cylinder and the second release cylinder are formed in the same cylinder block. This eliminates the need for adjusting the positions of the first master cylinder and the second release cylinder. In addition, it is possible to dispose the first master cylinder and the second release cylinder close to each other.

18 Claims, 10 Drawing Sheets

HYDRAULIC MECHANISM FOR VEHICLE

CROSS-REFERENCE TO RELATED APPLICATIONS

The present application claims priority under 35 USC 119 to Japanese Patent Application No. 2007-220435 filed on Aug. 27, 2007 the entire contents of which are hereby incorporated by reference.

BACKGROUND OF THE INVENTION

1. Field of the Invention

The present invention relates to an improvement in a hydraulic mechanism for a vehicle.

2. Description of Background Art

A conventional hydraulic mechanism for a vehicle is known wherein a single hydraulic piston is operated by two operating forces. See, for example, Japanese Patent Laid-open No. Hei 9-254771.

FIGS. 1 and 4 of Japanese Patent Laid-open No. Hei 9-254771 set forth a front wheel brake operating lever 11 swingably supported on a support shaft 77 together with an arc-shaped conjunction member 76 with one end of the conjunction member 76 placed in contact with an end part of a piston rod 58 provided to be integral with a master piston 57 in a front wheel master cylinder 13 and the other end of the conjunction member 76 being placed in contact with an end part of a piston rod 70 provided to be integral with a piston 69 in a front wheel slave cylinder 17.

The front wheel master cylinder 13 is connected to a brake caliper of a front wheel brake BF through a hydraulic oil passage 67.

A rear wheel brake operating lever 121 is connected to a rear wheel master cylinder 141, which is connected to the front wheel slave cylinder 17 through a hydraulic oil passage 54.

The front wheel master cylinder 13 and the front wheel slave cylinder 17 are connected to each other through connecting arm parts 55a, 55b protruding from the front wheel master cylinder 13 side and connecting arm parts 68a, 68b protruding from the front wheel slave cylinder 17 side.

The front wheel brake operating lever 11 produces an operating hydraulic pressure in the front wheel master cylinder 13. The hydraulic pressure is transmitted through the hydraulic oil passage 67 to the brake caliper of the front wheel brake BF and caliper pistons 15 provided inside the brake caliper clamp a brake disk therebetween, whereby the front wheel is braked.

In addition, when the rear wheel brake operating lever 121 is operated, hydraulic pressure is generated in the rear wheel master cylinder 141 and the hydraulic pressure is transmitted through the hydraulic oil passage 54 to the front wheel slave cylinder 17. Thus, the hydraulic pressure generated in the front wheel slave cylinder 17 causes the piston rod 70 to push one end of the conjunction member 76, so that the conjunction member 76 is swung about the support shaft 77, and the other end of the conjunction member 76 pushes the piston rod 58 in the front wheel master cylinder 13, whereby hydraulic pressure is generated in the front wheel master cylinder 13. Thus, the front wheel is braked in the same manner as above-mentioned.

The front wheel master cylinder 15 and the front wheel slave cylinder 17 are connected to each other through the connecting arm parts 55a, 55b and the connecting arm parts 68a, 68b. Thus, a manufacturing error or assembly error may change the positional relationship between the front wheel master cylinder 15 and the front wheel slave cylinder 17, resulting, for example, in a change in the moving amount of the master piston 57 in the front wheel master cylinder 15 upon movement of the piston 69 in the front wheel slave cylinder 17. There is a need for a structure in which the positional relationship between the master cylinder and the slave cylinder for use in a vehicle as above-mentioned will not be changed.

In addition, according to the above-mentioned structure, the front wheel master cylinder 15 and the front wheel slave cylinder 17 are spaced away from each other by a distance corresponding to the connecting arm parts 55a, 55b and the connecting arm parts 68a, 68b, so that the hydraulic mechanism will be large in overall size and will occupy a large space in the vehicle.

SUMMARY AND OBJECTS OF THE INVENTION

It is an object of an embodiment of the present invention to provide a hydraulic mechanism for a vehicle in which the positional relationship between two cylinders will not be changed and which can be made compact.

According to an embodiment of the present invention, a hydraulic mechanism for a vehicle includes a first hydraulic oil passage including a first master cylinder for generating hydraulic pressure, and a first release cylinder which is supplied with hydraulic pressure from the first master cylinder through a first oil pipe and which operates an object member. A second hydraulic oil passage includes a second master cylinder for generating hydraulic pressure, and a second release cylinder for generating hydraulic pressure in the first master cylinder according to hydraulic pressure transmitted thereto from the second master cylinder through a second oil pipe. A power transmission member for transmitting motive power is provided between the second release cylinder and the first master cylinder with the first master cylinder and the second release cylinder being formed in the same cylinder block.

As a result of the first master cylinder and the second release cylinder being disposed in the same cylinder block, it is needless to adjust the positions of the first master cylinder and the second release cylinder, so that the accuracy of the moving amounts of the pistons provided respectively in the first master cylinder and the second release cylinder is enhanced.

In addition, unlike the case where the first master cylinder and the second release cylinder are separate bodies, there is no need for a connecting member, and the first master cylinder and the second release cylinder can be disposed close to each other, thereby rendering the cylinder block compact.

According to an embodiment of the present invention, the first master cylinder is a clutch master cylinder for generating hydraulic pressure according to motive power given thereto. The first release cylinder is a clutch release cylinder to which hydraulic pressure is transmitted from the clutch master cylinder through the first oil pipe and which disengages a clutch, the second master cylinder is a manual master cylinder manually operated to generate hydraulic pressure. The second release cylinder is a manual release cylinder for generating hydraulic pressure in the clutch master cylinder according to hydraulic pressure transmitted thereto from the manual master cylinder through the second oil pipe.

As a result of the clutch master cylinder and the manual release cylinder being disposed in the same cylinder block, it is needless to adjust the positions of the clutch master cylinder and the manual release cylinder, and the accuracy of the moving amounts of the pistons provided respectively in the clutch master cylinder and the manual release cylinder is enhanced.

In addition, unlike the case where the clutch master cylinder and the manual release cylinder are separate bodies, there is no need for a connecting member, and the clutch master cylinder and the manual release cylinder can be disposed close to each other, thereby rendering the cylinder block compact.

According to an embodiment of the present invention, the respective cylinder axes of the first master cylinder and the second release cylinder are disposed on the same plane, thereby rendering the cylinder block thinner.

According to an embodiment of the present invention, the respective cylinder axes of the first master cylinder and the second release cylinder are disposed in parallel to each other.

This ensures that a cylinder bore for the first master cylinder and a cylinder bore for the second release cylinder can be machined in the cylinder block accurately and easily, and that the cylinder block is made small.

According to an embodiment of the present invention, the cylinder block is made by casing an aluminum alloy.

As a result of the cylinder block being made by casting an aluminum alloy, the radiating performance of the cylinder block is enhanced, and the cylinder block is made lighter in weight, as compared for example with the case of making the cylinder block from cast iron.

According to an embodiment of the present invention, the cylinder block is provided therein with respective cylinder bores of the first master cylinder and the second release cylinder by machining from the same direction.

As a result of the cylinder block being provided therein with respective cylinder bores of the first master cylinder and the second release cylinder by machining from the same direction, the accuracy of the cylinder bores and the positional accuracy of the two cylinder bores are enhanced.

According to an embodiment of the present invention, the first master cylinder is disposed above the second release cylinder. This ensures that air penetrating in the second release cylinder can be easily released into the first master cylinder on the upper side.

According to an embodiment of the present invention, the power transmission member is capable of transmission of motive power with a first master piston provided in the first master cylinder and with a second release piston provided in the second release cylinder. A part of a worm wheel can make contact with the power transmission member and the worm wheel is meshed with a worm attached to a rotary shaft of an electric motor.

This ensures that when the electric motor is driven, the worm wheel is rotated attendant on the rotation of the worm, and a part of the worm wheel comes into contact with the power transmission member, so that the power transmission member makes contact with the first master piston and pushes the first master piston.

As a result, hydraulic pressure is generated in the first master cylinder, and this hydraulic pressure is transmitted through the first oil pipe to the first release cylinder, so that the object member is operated by the first release cylinder.

In addition, when the second master cylinder is driven, hydraulic pressure is generated in the second master cylinder, and this hydraulic pressure is transmitted through the second oil pipe to the second release cylinder, wherein the second release cylinder drives the first master cylinder through the power transmission member to generates hydraulic pressure. As a result, the hydraulic pressure generated in the first master cylinder is transmitted to the first release cylinder to thereby operate the object member, like in the above-mentioned case.

According to an embodiment of the present invention, the worm is disposed to be on the lower side of the electric motor. This ensures that even in the case where, for example, abraded powder is generated in the sliding area between a brush and a commutator of the electric motor or in the meshing area between the worm and the worm wheel, the abraded powder can be dropped to the lower side by disposing the worm on the lower side of the electric motor.

According to an embodiment of the present invention, the rotary shaft of the electric motor and the plane are disposed in parallel to each other.

As a result, the amount of protrusion of the electric motor in the thickness direction of the cylinder block, which is made thinner, is reduced.

According to an embodiment of the present invention, the hydraulic mechanism further includes a first pressure sensor for detecting the pressure in the first oil pipe and a second pressure sensor for detecting the pressure in the second oil pipe with the first pressure sensor and the second pressure sensor being attached to the cylinder block from the lower side.

As a result of the first pressure sensor and the second pressure sensor being attached to the cylinder block from the lower side, the attaching parts of the first pressure cylinder and the second pressure cylinder are directed upwards, so that there is little possibility of air stagnating there.

According to an embodiment of the present invention, the vehicle is a saddle ride type vehicle. This ensures that the space occupied by the cylinder block when the cylinder block is disposed in a body space of a saddle ride type vehicle is reduced, since the first master cylinder and the second release cylinder block are provided to be integral with the cylinder block.

According to an embodiment of the present invention, the power transmission member for transmitting motive power is provided between the second release cylinder and the first master cylinder, and the first master cylinder and the second release cylinder are formed in the same cylinder block. Therefore, it is unnecessary to position the first master cylinder and the second release cylinder, and the accuracy of the moving amounts of the pistons provided respectively in the first master cylinder and the second release cylinder can be enhanced. In addition, since the first master cylinder and the second release cylinder can be disposed closely to each other in the cylinder block, it is possible to render the cylinder block compact. Thus, the hydraulic mechanism is rendered compact. Accordingly, the mountability of the hydraulic mechanism onto a vehicle can be enhanced.

According to an embodiment of the present invention, the first master cylinder is a clutch master cylinder for generating hydraulic pressure according to motive power given thereto, the first release cylinder is a clutch release cylinder to which hydraulic pressure is transmitted from the clutch master cylinder through the first oil pipe and which disengages a clutch, the second master cylinder is a manual master cylinder manually operated to generate hydraulic pressure, and the second release cylinder is a manual release cylinder for generating hydraulic pressure in the clutch master cylinder according to hydraulic pressure transmitted thereto from the manual master cylinder through the second oil pipe. Therefore, it is needless to position the clutch master cylinder and the manual release cylinder. Thus, the accuracy of moving amounts of pistons provided respectively in the clutch master cylinder and the manual release cylinder can be enhanced. In addition, since the clutch master cylinder and the manual release cylinder can be disposed closely to each other in the cylinder block, it is possible to render the cylinder block compact. Thus, the hydraulic mechanism is rendered compact. Accordingly, the mountability of the hydraulic mechanism onto a vehicle can be enhanced.

According to an embodiment of the present invention, respective cylinder axes of the first master cylinder and the second release cylinder are disposed on the same plane. Therefore, it is possible to render the cylinder block thinner, and to facilitate the mounting of the cylinder block into a narrow space in a vehicle.

According to an embodiment of the present invention, respective cylinder axes of the first master cylinder and the second release cylinder are disposed in parallel to each other. Therefore, a cylinder bore for the first master cylinder and a cylinder bore for the second release cylinder can be machined in the cylinder block accurately and easily. In addition, the cylinder block is made small in size, so that the cylinder block can be easily mounted into a narrow space in a vehicle.

According to an embodiment of the present invention, the cylinder block is made by casting an aluminum alloy. This makes it possible to enhance the radiation performance of the cylinder block and to reduce the weight of the cylinder block.

According to an embodiment of the present invention, the cylinder block is provided therein with respective cylinder bores of the first master cylinder and the second release cylinder by machining from the same direction. Therefore, it is possible to enhance the machining accuracy of each of the first master cylinder and the second release cylinder, and to enhance the positional accuracy of the first master cylinder and the second release cylinder.

According to an embodiment of the present invention, the first master cylinder is disposed above the second release cylinder. This ensures that air mixing into oil in the second release cylinder is moved into the first master cylinder on the upper side, so that deaeration can be easily achieved.

According to an embodiment of the present invention, the power transmission member is capable of transmission of motive power with a first master piston provided in the first master cylinder and with a second release piston provided in the second release cylinder, a part of a worm wheel can make contact with the power transmission member with the worm wheel being meshed with a worm attached to a rotary shaft of an electric motor. Therefore, by driving the electric motor, it is possible to operate the power transmission member through the worm and the worm wheel. In addition, by driving the second release cylinder, it is possible to operate the power transmission member independently from the electric motor side.

According to an embodiment of the present invention, the worm is disposed to be on the lower side of the electric motor. Therefore, the abraded powder generated on the electric motor itself or in the meshing area between the worm and the worm wheel can be dropped to the lower side, whereby the abraded powder can be prevented from penetrating into the inside of the electric motor or into major parts of the electric motor such as a stator and a rotor.

According to an embodiment of the present invention, the rotary shaft of the electric motor and the plane are disposed in parallel to each other. Therefore, it is possible to reduce the amount of protrusion of the electric motor in the thickness direction of the cylinder block, which is made thinner, and to render the parts of the hydraulic mechanism thinner. Consequently, it is possible to easily mount the hydraulic mechanism into a narrow space in a vehicle.

According to an embodiment of the present invention, the hydraulic mechanism further includes a first pressure sensor for detecting the pressure in the first oil pipe and a second pressure sensor for detecting the pressure in the second oil pipe with the first pressure sensor and the second pressure sensor being attached to the cylinder block from the lower side. Therefore, it is possible to prevent air stagnation areas from being easily formed in the surroundings of the first pressure sensor and the second pressure sensor, and to facilitate a deaerating operation.

According to an embodiment of the present invention, the vehicle is a saddle ride type vehicle. Therefore, with the first master cylinder and the second release cylinder of the saddle ride type vehicle being provided integrally, the first master cylinder and the second release cylinder can be made close to each other and compact, and it is possible to effectively utilize the body space in the saddle ride type vehicle in which the hydraulic mechanism is disposed.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
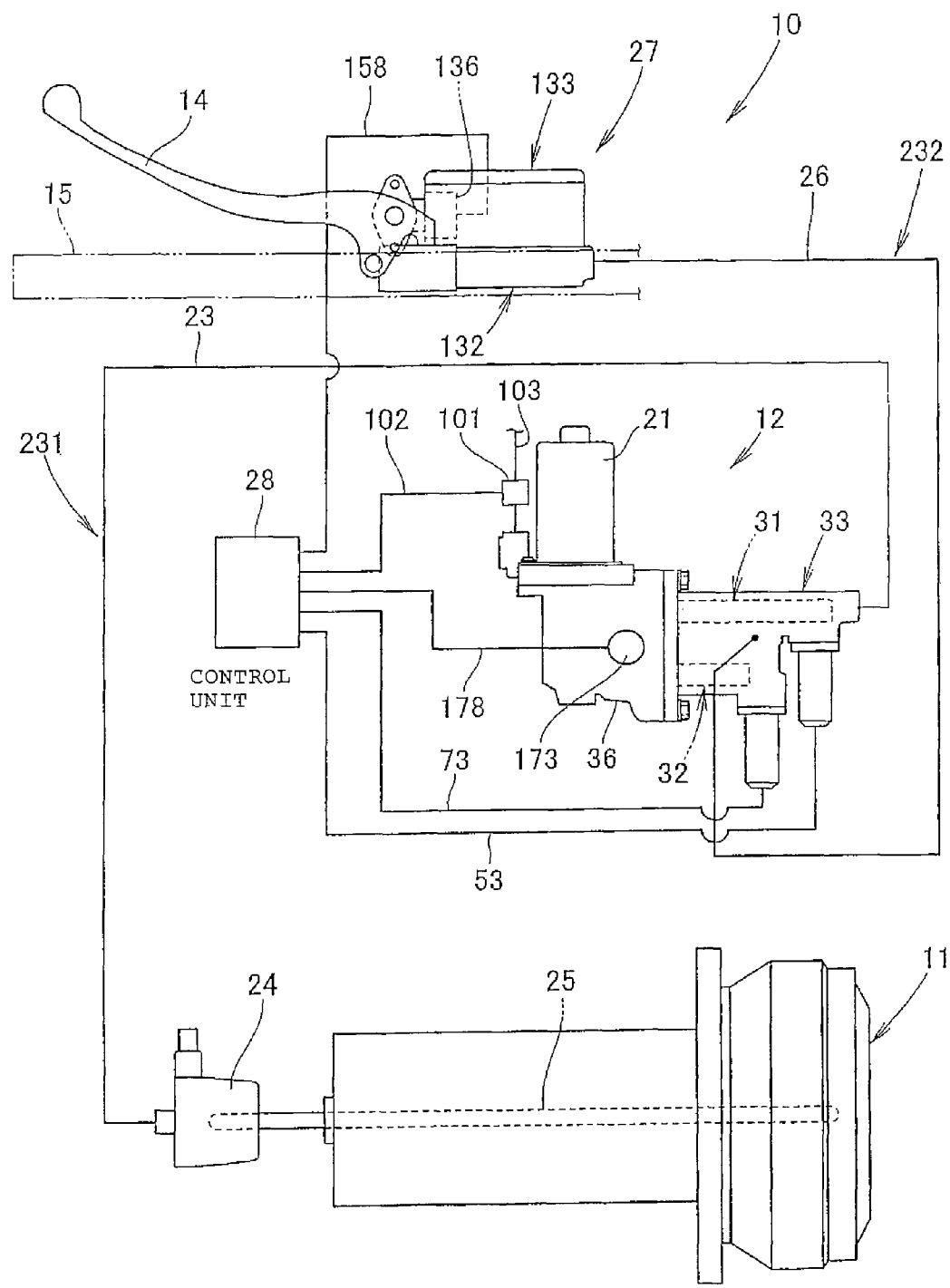
FIG. 1 is a system diagram of a clutch hydraulic mechanism for a vehicle according to the present invention.

A best mode for carrying out the present invention will be described below, based on the accompanying drawings. FIG. 1 is a system diagram of a clutch hydraulic mechanism for a vehicle according to the present invention. The clutch hydraulic mechanism 10 is a system which, at the time of making/breaking transmission of motive power between an engine and a transmission provided on a saddle ride type vehicle such as a motorcycle and an all-terrain vehicle by a clutch 11, the clutch hydraulic mechanism 10 can normally detect the force of a step on a gear change pedal, vehicle speed, etc. The clutch hydraulic mechanism automatically disconnects or connects the clutch 11 through, for example, an actuator unit 12 at the time of gear change and can also manually disconnect or connect the clutch 11 through a clutch lever 14, as required.

The clutch hydraulic mechanism 10 includes the actuator unit 12 provided with an electric motor 21 as a drive source for generating hydraulic pressure with a first release cylinder 24 connected to the actuator unit 12 through a first hydraulic oil pipe 23. A push rod 25 is disposed between the first release cylinder 24 and the clutch 11 with a lever-operated part 27 provided on a bar handle 15 of the motorcycle and connected through the actuator unit 12 through a second hydraulic oil pipe 26. A control unit 28 is provided for controlling the operation of the electric motor 21 of the actuator unit 12 on the basis of input signals from various sensors (to be detailed later) provided at the actuator unit 12 and the lever operating part 27 and on the basis of such signals as the gear position of a transmission, engine speed, vehicle speed, throttle opening, etc. obtained from an engine control unit (not shown).

In the clutch hydraulic mechanism 10, the electric motor 21 of the actuator unit 12 is operated to generate hydraulic pressure, and the hydraulic pressure is transmitted to the first release cylinder 24 so as to automatically disconnect the clutch 11 through the push rod 25. In the alternative, the clutch lever 14 is operated to generate hydraulic pressure in the lever-operated part 27, and the hydraulic pressure is transmitted sequentially through a second hydraulic oil pipe 26, the actuator unit 12 and the first hydraulic oil pipe 23 to the first release cylinder 24, thereby disconnecting the clutch 11 through the push rod 25 on a manual basis. In order to connect the clutch 11, the hydraulic pressure is lowered.

Figure 2:
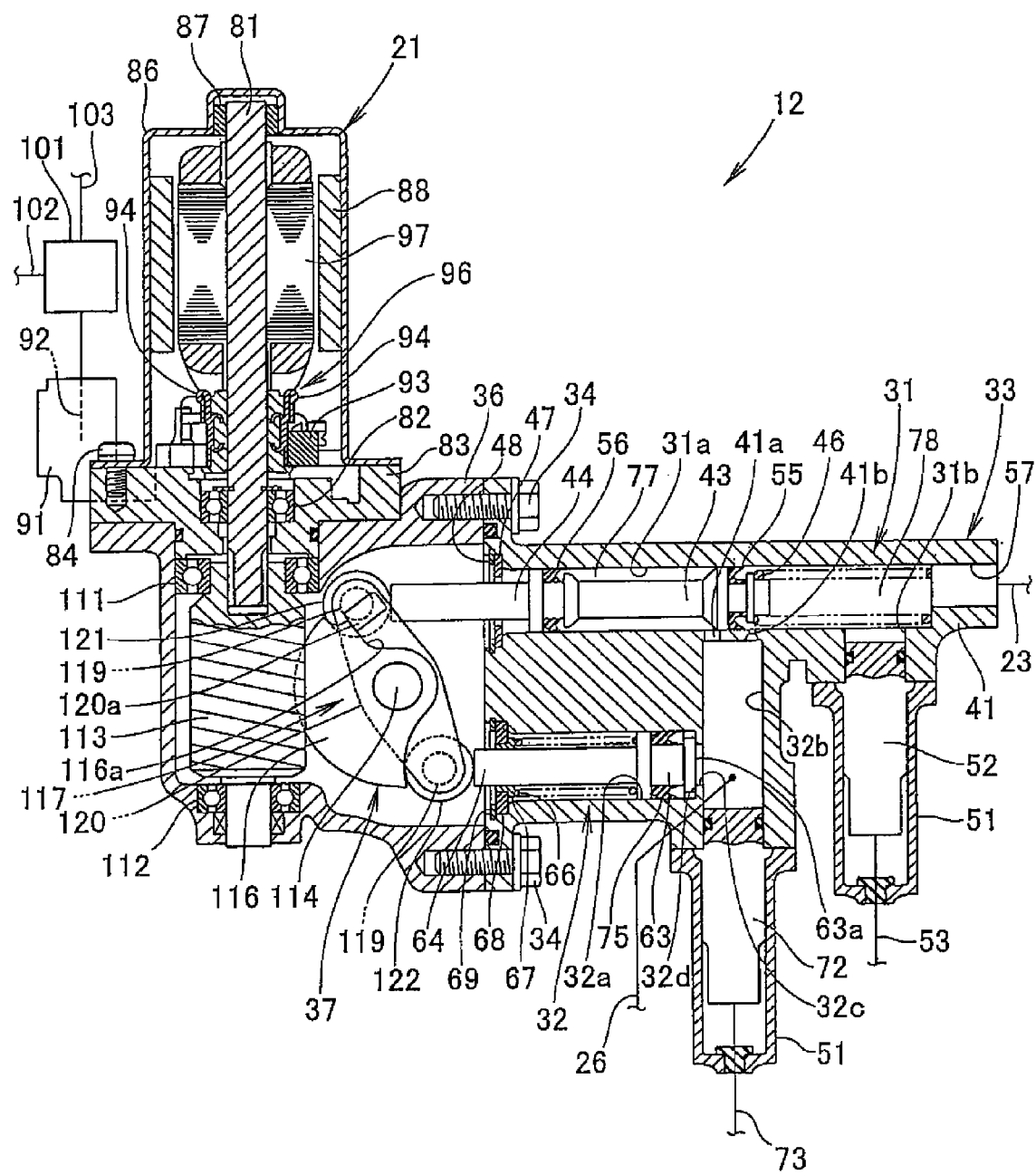
FIG. 2 is an illustration of an actuator unit of the clutch hydraulic mechanism according to the present invention.

FIG. 2 is an illustration of the actuator unit in the clutch hydraulic mechanism according to the present invention. The actuator unit 12 includes a cylinder formation part 33 provided with a first master cylinder 31 and a second release cylinder 32 with a gear case 36 attached to a side surface of the cylinder formation part 33 by a plurality of bolts 34. The electric motor 21 is attached to an upper part of the gear case 36. A pushing force transmitting part 37 is provided by which a drive force of the electric motor 21 is transmitted to the first master cylinder 31 or by which a pushing force due to the hydraulic pressure generated in the second release cylinder 32 is transmitted to the first master cylinder 31.

The cylinder formation part 33 has a cylinder block 41 provided therein with a first cylinder bore 31a of the first master cylinder 31, and with a second cylinder bore 32a of the second release cylinder 32 provided on the lower side of and in parallel to the first master cylinder 31.

The first master cylinder 31 includes the cylinder block 41 made by casting (for example, die-casting) an aluminum alloy, the first cylinder bore 31a with a piston 43 movably inserted in the first cylinder bore 31a. A rod 44 is formed integrally with the piston 43 with a compression coil spring 46 being provided between one end of the piston 43 and one end part of the first cylinder bore 31a for the purpose of pushing out the piston 43 and the rod 44 to the side of the pushing force transmitting part 37. A washer 47 and a stop ring 48 are provided at the other end part of the first cylinder bore 31a for the purpose of preventing the piston 43 from coming out of the first cylinder bore 31a.

The first cylinder bore 31a and the second cylinder bore 32a in the cylinder block 41 are machined from the same direction. More specifically, from the left side in FIG. 2. This makes it possible to enhance the machining accuracy of each of the first cylinder bore 31a and the second cylinder bore 32a, and to enhance the positional accuracy (inclusive of parallelism) of the first cylinder bore 31a and the second cylinder bore 32a.

The pressure of the oil in the first cylinder 31a (namely, the pressure of the oil in the first hydraulic oil pipe 23) is detected by a pressure sensor 52 attached to a first communicating hole 31b, which communicates with the first cylinder bore 31a from the lower side, from the lower side by a fixture 51. A wire 53 is provided for sending a hydraulic pressure signal from the pressure sensor 52 to the control unit 28 (see FIG. 1).

A rubber-made primary cup 55 and a rubber-made secondary cup 56 are attached to the piston 43 for sealing the gap between the piston 43 and the first cylinder bore 31a. A pipe connection port 57 is provided at one end part of the first cylinder bore 31a for connecting the first hydraulic oil pipe 23.

The second release cylinder 32 includes the cylinder block 41, a piston 63 movably inserted in the second cylinder bore 32a, a rod 64 formed integrally with the piston 63 and a compression coil spring 66 abutting on the piston 63 at one end thereof for pushing out the piston 63 and the rod 64 to the side opposite to the pushing force transmitting part 37. A spring receiving member 67 is provided for the purpose of receiving the other end of the compression coil spring 66. A washer 68 and a stop ring 69 are provided in the second cylinder bore 32a for the purpose of supporting the spring receiving part 67.

The pressure of the oil in the second cylinder bore 32a (namely, the pressure of the oil in the second hydraulic oil pipe 26) is detected by a pressure sensor 72 attached to a second communicating hole 32b, which communicates with the second cylinder bore 32a from a lateral side through a communication port 32c, from the lower side by a fixture 51. A wire 73 is provided for sending a hydraulic pressure signal from the pressure sensor 72 to the control unit 28.

As illustrated in FIG. 2, a stepped part 32d is formed between the second cylinder bore 32a and the communication port 32c. An end face 63a of the piston 63 is pressed against the stepped part 32d by the compression coil spring 66. A rubber-made cup 75 is attached to the piston 63 for the purpose of sealing a gap between the piston 63 and the second cylinder bore 32a.

The second communicating hole 32b communicates with the first cylinder bore 31a through a large diameter hole 41a and a small diameter hole 41b.

The large diameter hole 41a and the small diameter hole 41b are holes which are formed on the lower side of the first cylinder bore 31a and by which the oil in a reservoir tank (detailed later referring to FIG. 3) provided at the lever-operated part 27 (see FIG. 1) is supplied into both the first master cylinder 31 and the second release cylinder 32. This ensures that, even when the amount of the oil in all the hydraulic oil passages in the clutch hydraulic mechanism 10 (see FIG. 1) is varied due to temperature variations, abrasion of frictional members in the clutch 11 (see FIG. 1) or the like, the oil in the reservoir tank is supplied or the oil is recovered from the hydraulic oil passages into the reservoir tank.

The two holes consisting of the large diameter hole 41a and the small diameter hole 41b are formed so as to ensure that both of two oil chambers 77, 78 formed respectively on both sides of the primary cup 55 in the first cylinder bore 31a communicate with the second communication hole 32b to enable flow-in/flow-out of the oil.

In the actuator unit 12, specifically, in the cylinder formation part 33 in the present embodiment, the primary cup 55 of the first master cylinder 31 is disposed on the first hydraulic oil pipe 23 side relative to an end part of the second release cylinder 32 (more specifically, the second cylinder bore 32a). Therefore, by disposing the second communicating hole 32b adjacent to the second cylinder bore 32a, the large diameter hole 41a and the small diameter hole 41b for providing communication between the second communicating hole 32b and the first cylinder hole 31a can each be formed in a simple shape, more specifically, a straight and short round hole shape. Accordingly, it is possible to save space and to reduce the machining cost.

The electric motor 21 includes a rotary shaft 81 extending vertically, a base part 83 attached to an upper part of the gear case 36 by a plurality of bolts so as to rotatably support the rotary shaft 81 through a bearing 82, a motor housing 86 attached to the base part 83 by a plurality of small screws 84 with a radial bearing (sliding bearing) 87 attached to an end part of the motor housing 86 so as to support the rotary shaft 81. A stator 88 is included with a permanent magnet attached to the inside surface of the motor housing 86. An electric power supplying connector 91 is attached to the base part 83 with a brush 93 being connected to connection terminals 92, 92 (only symbol 92 on one side is shown) of the electric power supplying connector 91 through wires (not shown). A commutator 96 is included with a plurality of commutator pieces 94 attached to the rotary shaft 81 for the purpose of passing a current from the brush 93. A rotor 97 is included with a core and a coil which are attached to the rotary shaft 81 so as to face the stator 88.

In FIG. 2, a motor driving part 101 is provided for driving the electric motor 21 and is connected to the control unit 28 (see FIG. 1) through a wire 102. Based on a control signal from the control unit 28, the passing of current to the electric motor 21 through an electric power supplying wire 103 connected to the electric power supplying connector 91 is controlled, whereby driving (normal rotation or reverse rotation) and stopping of the electric motor 21 are performed.

The pushing force transmitting part 37 includes a worm 113 which is spline connected to the lower end of the rotary shaft 81 of the electric motor 21 and which is rotatably supported on the gear case 36 through bearings 111, 112. A support shaft 114 is rotatably mounted to the gear case 36. A sector-shaped worm wheel 116 is attached to the support shaft 114 and meshed with the worm 113. A see-saw member 117 is rotatably mounted to the support shaft 114.

The see-saw member 117 includes a see-saw body 120 rotatably supported on the support shaft 114 and a first roller 121 and a second roller 122 which are rotatably supported respectively on both ends of the see-saw member 120 through support shafts 119.

The see-saw member 120 is provided at its side surface with a protrusion 120a abutted on an end surface 116a of the worm wheel 116.

The first roller 121 is a member against which the rod 44 of the first master cylinder 31 is pressed by an elastic force of the compression coil spring 46.

The second roller 122 is a member which can abut on the tip of the rod 64 of the second release cylinder 32. When the second roller 122 is pressed against the rod member 64, the see-saw member 117 is rotated clockwise about the support shaft 114, and the first roller 121 pushes out the rod 44 to the right in FIG. 2.

The worm 113 of the pushing force transmitting part 37 is disposed on the lower side of the electric motor 21. This ensures that, when abraded powder is generated in the meshing area between the worm 113 and the worm wheel 116, the abraded powder can be dropped to the lower side, so that there is no fear that the abraded powder would affect the operation of the electric motor 21.

In addition, since the brush 93 and the commutator 96 of the electric motor 21 are disposed below the stator 88 and the rotor 97, abraded powder generated from the brush 93 can be dropped to the lower side, in the same manner as the above-mentioned abraded powder.

Figure 3:
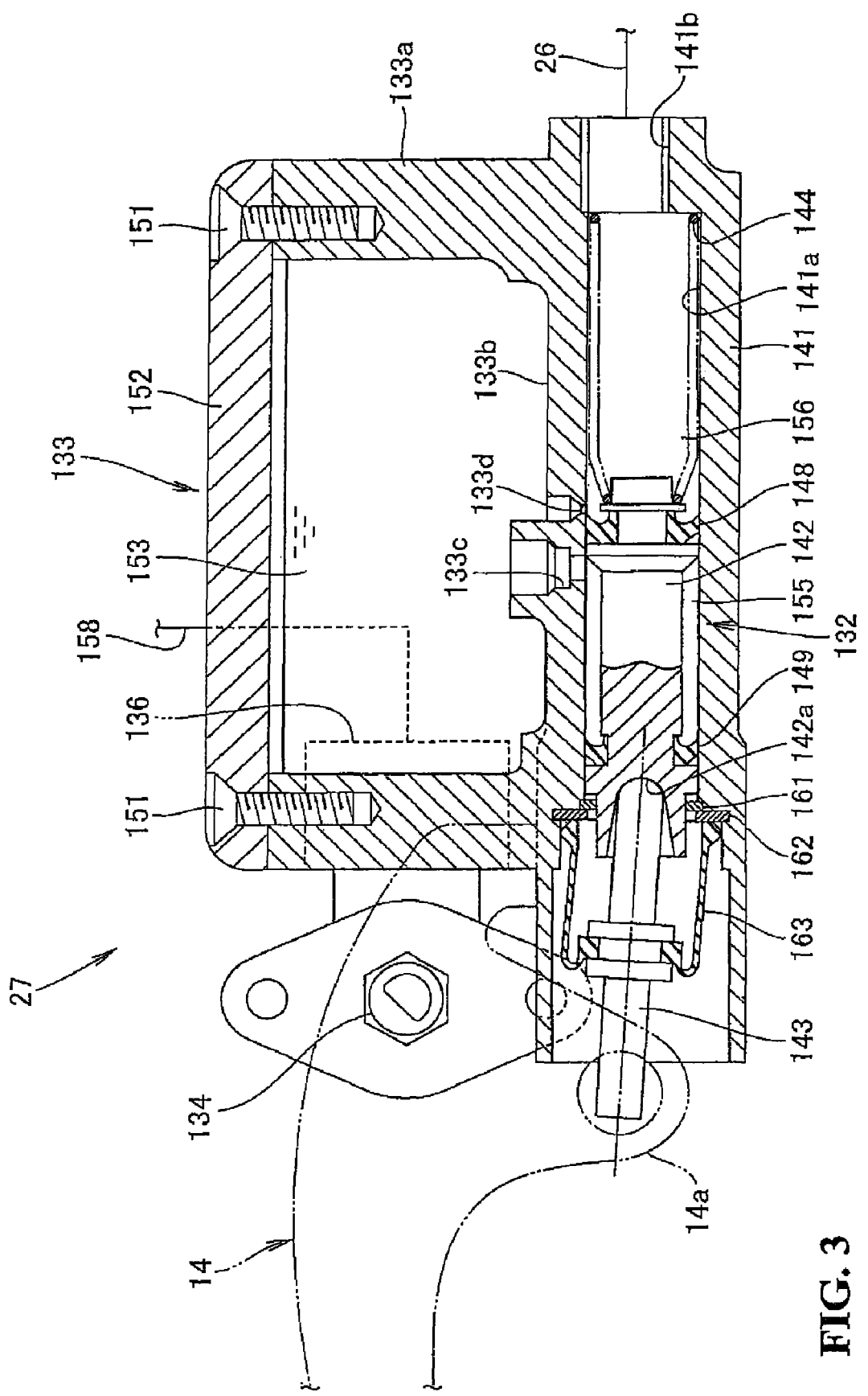
FIG. 3 is a sectional view showing a lever-operated part of the clutch hydraulic mechanism according to the present invention.

FIG. 3 is a sectional view of the lever-operated part of the clutch hydraulic mechanism according to the present invention. The lever-operated part 27 includes the clutch lever 14, a second master cylinder 132 for generating hydraulic pressure in response to an operation of the clutch lever 14, a reservoir tank 133 provided integrally with the second master cylinder 132 and a lever rotating angle sensor 136 attached to a swing shaft 134 of the clutch lever 14 for the purpose of detecting the swing angle of the clutch lever 14.

The second master cylinder 132 includes a tubular cylinder body 141, a piston 142 movably inserted in a cylinder bore 141a provided in the cylinder body 141, a rod 143 having its one end connected to an arm part 14a of the clutch lever 14 and its other end inserted in a recess 142a in the piston 142 for the purpose of pressing the piston 142 and a spring 144 for pushing out the piston 142 to the side of the rod 143. The second hydraulic oil pipe 26 is connected to a pipe connection port 141b provided at an end part of the cylinder body 141. A rubber-made primary cup 148 and a rubber-made secondary cup 149 are attached to the piston 142 for the purpose of sealing a gap between the piston 142 and the cylinder bore 141a.

The reservoir tank 133 includes a body part 133a formed integrally with the cylinder body 141, and a cover part 152 attached by a plurality of small screws 151 for closing an upper aperture of the body part 133a to hold the oil 153 contained therein. As shown in FIG. 1, the reservoir tank 133 is attached to the bar handle 15, and is located at the highest position of the body of the vehicle (the position is also a position where it is easy to check the amount of the oil 153 and to supply the oil).

The body part 133a is provided in a bottom part 133b thereof with a large diameter hole 133c and a small diameter hole 133d which communicate with the cylinder bore 141a of the second master cylinder 132. Therefore, even when the amount of the oil in all the hydraulic oil passages (namely, a first hydraulic oil passage 231 and a second hydraulic oil passage 232 (see FIG. 1) which will be described later) in the clutch hydraulic mechanism 10 (see FIG. 1) is varied due to temperature variations, abrasion of frictional members in the clutch 11 (see FIG. 1) or the like, the oil 153 in the reservoir tank 133 is supplied, or the oil 153 is recovered from the hydraulic oil passages into the reservoir tank 133.

The two holes consisting of the large diameter hole 133c and the small diameter hole 133d are provided for supplying the oil 153 into both of the two oil chambers 155 and 156 formed respectively on both sides of a primary cup 148 inside the cylinder bore 141a or for recovering the oil 153 from both of the oil chambers 155, 156.

The lever rotating angle sensor 136 is connected to the control unit 28 (see FIG. 1) through a wire 158.

A washer 161 is provided for preventing the piston 142 from coming out of the cylinder bore 141a. A stop ring 162 is provided for fixing the washer 161 to the cylinder body 141. A dust cover 163 is provided.

Figure 4:
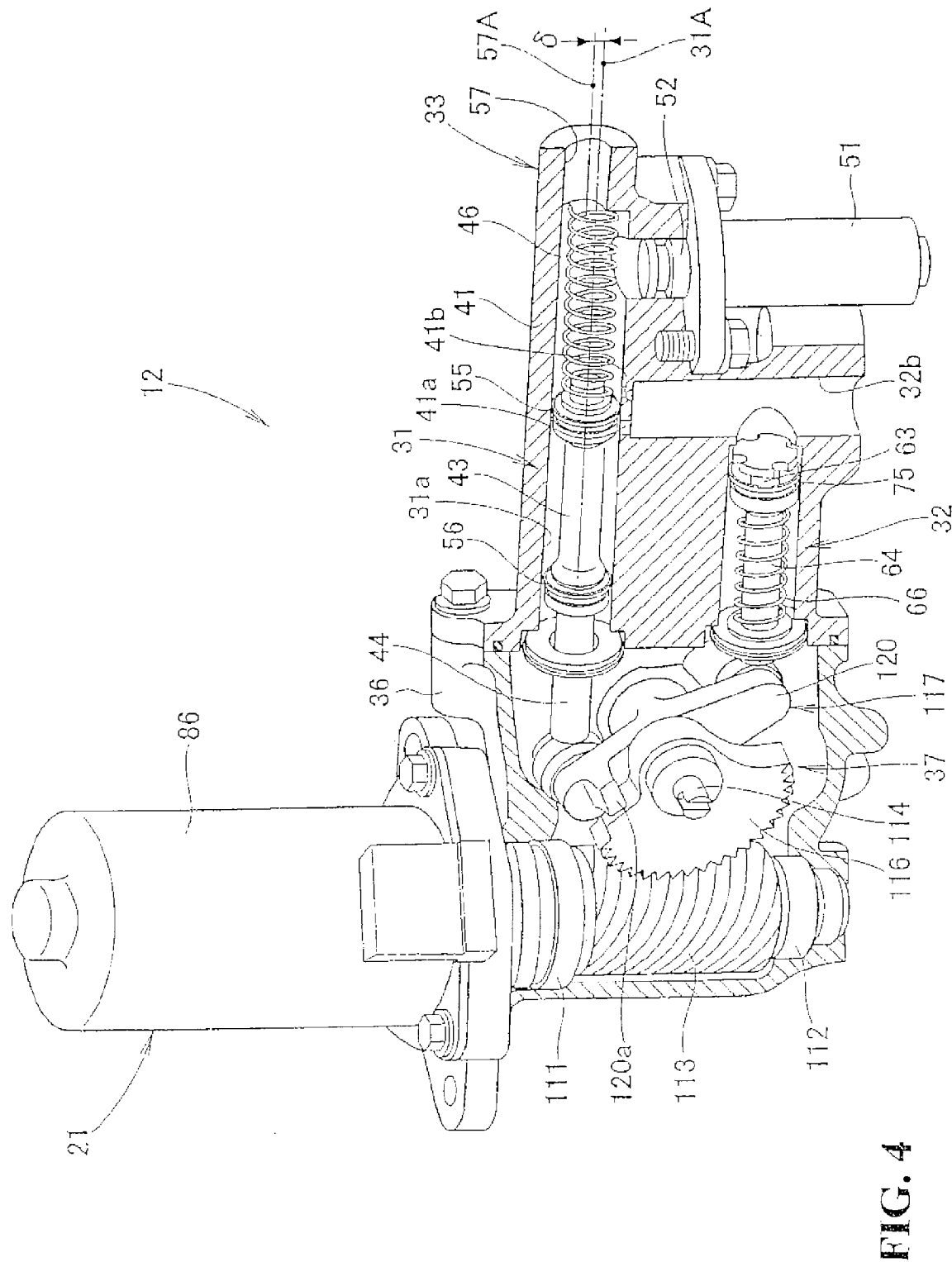
FIG. 4 is a first perspective view of the actuator unit according to the present invention.

FIG. 4 is a first perspective view of the actuator unit according to the present invention. The actuator unit 12 includes the first master cylinder 31 and the second release cylinder 32 integrally provided as upper and lower two cylinders in the cylinder block 41. The cylinder block 41 is provided therein with the electric motor 21 and the pushing force transmitting part 37 by which the drive force of the electric motor 21 is transmitted to the first master cylinder 31 or by which a pushing force generated by the second release cylinder 32 is transmitted to the first master cylinder 31. This configuration ensures that the actuator unit 12 is made compact and small in size, so that the actuator unit 12 can be easily disposed in a narrow body space in the motorcycle.

As has been shown in FIGS. 2 and 4 above, in the present invention, the cylinder block 41 is provided therein with the cylinder bores 31a and 32a of the first master cylinder 31 and the second release cylinder 32 by machining from the same direction, whereby it is possible to enhance the machining accuracy of each of the first master cylinder 31 and the second release cylinder 32 and to enhance the positional accuracy of the first master cylinder 31 and the second release cylinder 32.

In the present invention, the worm 113 is disposed on the lower side of the electric motor 21, so that abraded powder generated on the electric motor 21 itself or in the meshing area between the worm 113 and the worm wheel 116 can be dropped to the lower side, and the abraded powder can be prevented from penetrating into the inside of the electric motor 21 or into major parts of the electric motor 21 such as the stator 88, the rotor 97, etc.

The pipe connection port 57 for connecting the first hydraulic oil pipe 23 (see FIG. 2) to the first master cylinder 31 is made to be smaller in the inner diameter than the first cylinder bore 31a, and its axis 57A is set off upward from the axis 31A of the first cylinder bore 31a by a distance 6. The actuator unit 12 is mounted to the vehicle body so that the pipe connection port 57 is oriented upward by two to five degrees from a horizontal plane.

This ensures that an uppermost part of the inner peripheral surface of the pipe connection port 57 is horizontally connected to an uppermost part of the inner peripheral surface of the first cylinder bore 31a, or the uppermost part of the inner peripheral surface of the pipe connection port 57 is higher than the uppermost part of the inner peripheral surface of the first cylinder bore 31a. Further, since the uppermost part of the inner peripheral surface of the pipe connection port 57 is inclined so as to be higher than the uppermost part of the inner peripheral surface of the first cylinder bore 31a, air mixing into the oil in the first cylinder bore 31a can be easily released through the pipe connection port 57 into the first hydraulic oil pipe 23, and a deaeration work can be performed efficiently by use of a deaeration plug 186 of the first release cylinder 24 which will be described later referring to FIG. 7.

Figure 5:
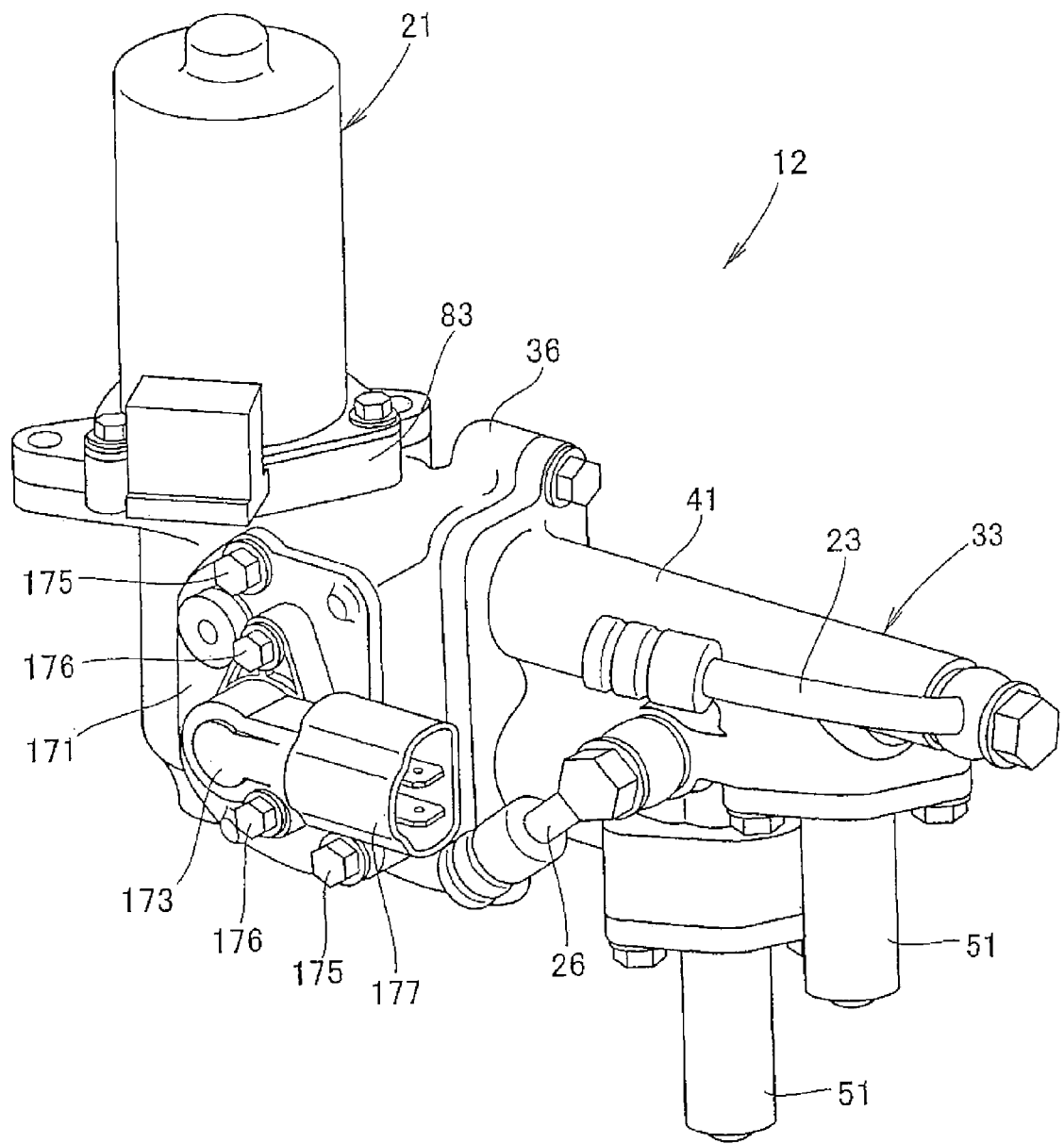
FIG. 5 is a second perspective view of the actuator unit according to the present invention.

FIG. 5 is a second perspective view of the actuator unit according to the present invention. The gear case 36 of the actuator unit 12 is provided with an aperture (not shown) in a side surface thereof, and is provided with a cover member 171 which closes the aperture and which rotatably support one end of the support shaft 114 (see FIG. 2) of the pushing force transmitting part 37 (see FIG. 2). A worm wheel rotating angle sensor 173 for detecting the rotating angle of the worm wheel 116 (see FIG. 2) is attached to the cover member 171 through the support shaft 114.

A plurality of bolts 175 are provided for attaching the cover member 171 to the gear case 36. A plurality of bolts 176 are provided for attaching the worm wheel rotating angle sensor 173 to the cover member 171. A connector 177 is provided by which an output signal from the worm wheel rotating angle sensor 173 is connected to the control unit 28 (see FIG. 1) side through a wire 178 (see FIG. 1).

As shown in FIGS. 2 and 5 above, in the present invention, the pressure sensor 52 is a first pressure sensor for detecting the pressure inside the first hydraulic oil pipe 23 and the pressure sensor 72 is a second pressure sensor for detecting the pressure inside the second hydraulic oil pipe 26. The pressure sensors 52 and 57 are attached to the cylinder block 41 from the lower side. Therefore, air stagnation areas are not liable to be formed in the surroundings of the pressure sensors 52, 72, and the deaeration work can be performed easily.

Figure 6:
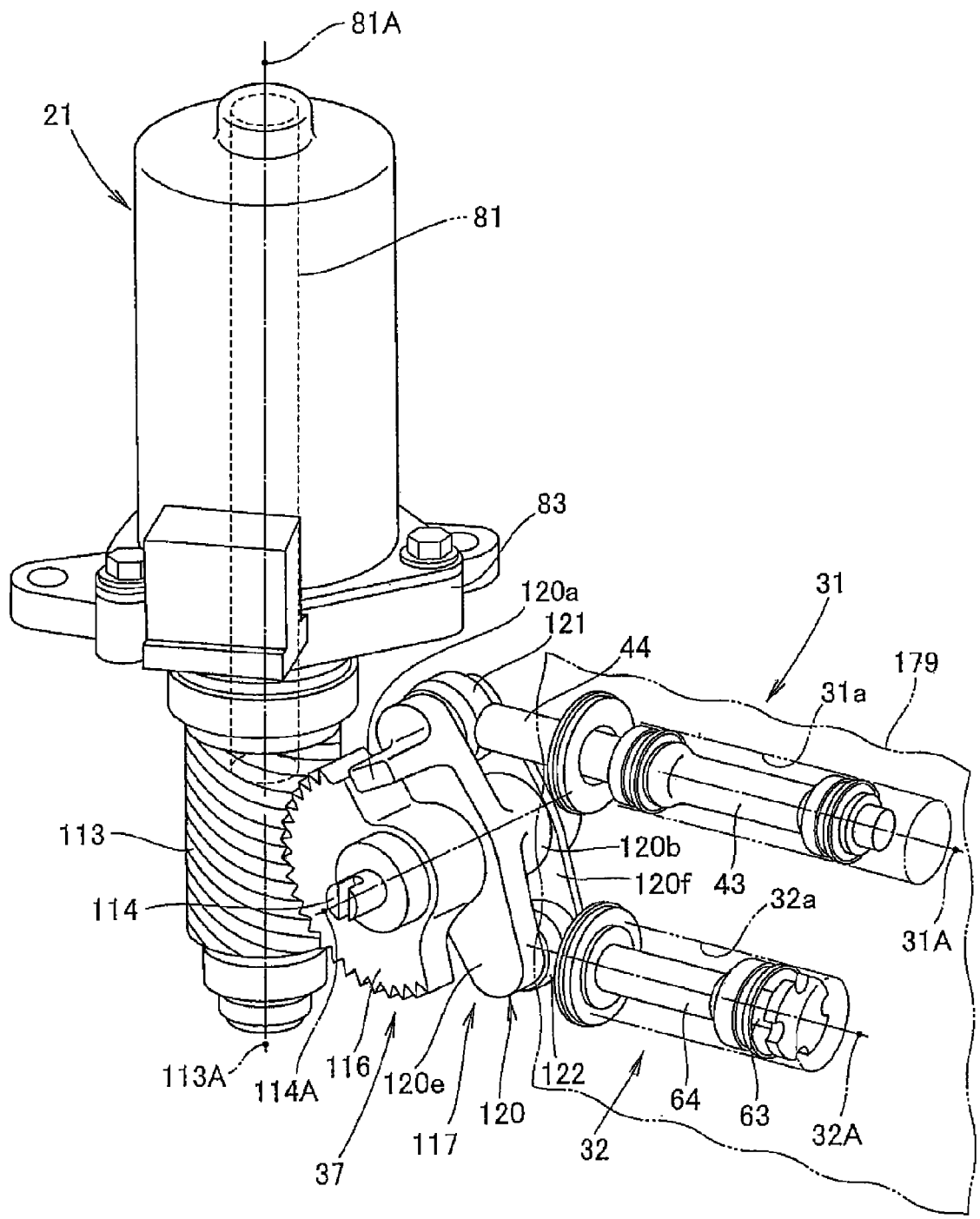
FIG. 6 is a perspective view showing a part of the actuator unit according to the present invention.

FIG. 6 is a perspective view of a part of the actuator unit according to the present invention. The axis of the piston 43 in the first master cylinder 31, i.e., the axis 31A of the first cylinder bore 31a and the axis of the piston 63 in the second release cylinder 32, i.e., the axis 32A of the second cylinder bore 32a are present in the same plane 179 and are parallel to each other. In addition, the axis 31A and the axis 32A are orthogonal to the axis 114A of the support shaft 114 of the pushing force transmitting part 37.

With the axis 31A and the axis 32A disposed in the same plane 179, the cylinder block 41 (see FIG. 2) can be made thin. In addition, with the axis 31A and the axis 32A set to be parallel to each other, it is possible to easily machine the first cylinder bore 31a and the second cylinder bore 32a, and to reduce the height of the cylinder block 41. Further, with the axis 31A and the axis 32A set orthogonal to the axis 114A, the plane 179 is made to be parallel to respective loci of rotation of the worm wheel 116 and the see-saw member 117, which makes it possible to render the pushing force transmitting part 37 thinner and to save space.

In addition, preferably, the axis 81A of the rotary shaft 81 of the electric motor 21 and the axis 113A of the worm 113 coaxial with the axis 81A are parallel to the plane 179 passing through the axis 31A and the axis 32A. As a result of the foregoing, the axis 114A is orthogonal to the axes 81A and 113A.

With the plane 179 thus set in parallel to the axis 81A and the axis 113A, the pushing force transmitting part 37 can be made to be thinner. Thus, a space saving can be achieved.

Further, with the axis 114A set orthogonal to the axes 81a and 113A, the actuator unit 12 (see FIG. 5) as a whole can be made thin. Thus, a space saving can be achieved. In addition, the mountability of the actuator unit 12 onto the vehicle can be enhanced. Furthermore, a high reduction ratio worm gear pair including the worm 113 and the worm wheel 116 can be easily adopted, and the pushing force transmitting part 37 can be configured to be simple. Thus, a space saving and cost reduction can be achieved.

A see-saw body 120 of the see-saw member 117 includes a main see-saw member 120e having the protrusion 120a and a boss part 120b formed integrally, and a sub see-saw body 120f disposed adjacent to the main see-saw member 120e. The sub see-saw member 120f is joined to the main see-saw member 120e by two support shafts 119, 119 (see FIG. 2) and the boss part 120b.

As has been above-description, in the present invention, the axis 31A and the axis 32A as respective cylinder axes of the first master cylinder 31 and the second release cylinder 32 are disposed on the same plane 179. Therefore, the cylinder block 41 (see FIG. 4) can be made thinner, and can be easily mounted in a narrow space in the vehicle.

In the present invention, the respective axes 31A and 32A of the first master cylinder 31 and the second release cylinder 32 are set parallel to each other. Therefore, the first cylinder bore 31a for the first master cylinder 31 and the second cylinder bore 32a for the second release cylinder 32 can be machined in the cylinder block 41 accurately and easily. In addition, the cylinder block 41 is reduced in size, so that it can be easily mounted in a narrow space in the vehicle.

Furthermore, in the present invention, the rotary axis 81 of the electric motor 21, more specifically, the axis 81A of the rotary shaft 81 is set in parallel to the plane 179. This makes it possible to reduce the amount of protrusion of the electric motor in the thickness direction of the cylinder block 41, which is made to be thin, to make thin the parts of the clutch hydraulic mechanism 10 (see FIG. 1) as the hydraulic mechanism, and to easily mount the clutch hydraulic mechanism 10 in a narrow space on the vehicle.

In addition, as has been shown in FIGS. 1, 2 and 6 above, the present invention provides the clutch hydraulic mechanism 10 for a vehicle, including the first hydraulic oil passage 231 as a clutch hydraulic oil passage having the first master cylinder 31 as a clutch master cylinder for generating hydraulic pressure by motive power given thereto, and the first release cylinder 4 as a clutch release cylinder to which hydraulic pressure is transmitted from the first master cylinder 31 through the first hydraulic oil pipe 23 as a first oil pipe and which disengages the clutch 11. The second hydraulic oil passage 232 is provided as a manual hydraulic oil passage having the second master cylinder 132 as a manual master cylinder operated manually to generate hydraulic pressure, and the second release cylinder 32 for generating hydraulic pressure in the first master cylinder 31 according to the hydraulic pressure transmitted from the second master cylinder 132 through the second hydraulic pipe 26 as a second oil pipe. The see-saw member 117, as a motive power transmitting member for transmitting motive power, is provided between the second release cylinder 32 and the first master cylinder 31. The first master cylinder 31 and the second release cylinder 32 are disposed in the same cylinder block 41 so that the axes 31A and 32A as respective cylinder axes are parallel to each other. Therefore, it is needless to position the first master cylinder 31 and the second release cylinder 32, and it is possible to enhance the accuracy of the moving amounts of the pistons 43 and 63 provided respectively in the first master cylinder 31 and the second release cylinder 32. In addition, since the first master cylinder 31 and the second release cylinder 32 can be disposed in the cylinder block 41 closely to each other, it is possible to render the cylinder block 41 compact. Thus, the clutch hydraulic mechanism 10 is rendered more compact (namely, to save space). Thus, it is possible to achieve a reduction in weight. As a result of the foregoing, it is possible to enhance the mountability of the clutch hydraulic mechanism 10, more specifically, the actuator unit 12 onto the vehicle.

Furthermore, in the present invention, the cylinder block 41 is made by casting an aluminum alloy, so that it is possible to enhance radiation performance of the cylinder block 41 and to reduce the weight of the same.

Figure 7:
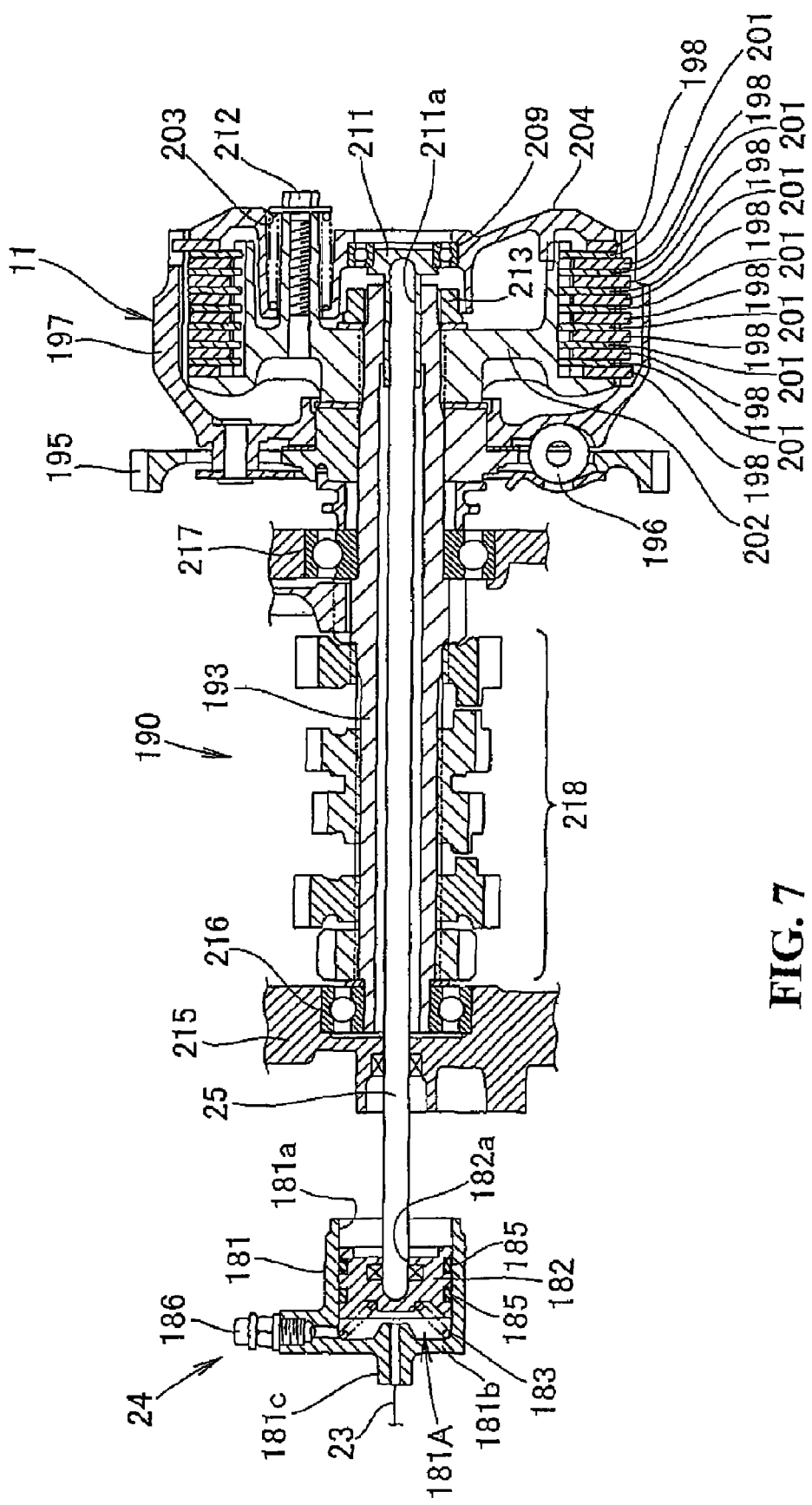
FIG. 7 is a sectional view for illustrating a first release cylinder and a clutch according to the present invention.

FIG. 7 is a sectional view for illustrating the first release cylinder and the clutch according to an embodiment of the present invention. The first release cylinder 24 includes a bottomed tubular cylinder body 181, a piston 182 movably inserted in a cylinder bore 181a formed in the cylinder body 181 and a spring 183 which is disposed between the piston 182 and a bottom wall 181b of the cylinder body 181 and which pushes out the piston 182 to the side of the push rod 25. An oil chamber 181A is provided together with a pipe connection port 181c provided in the bottom wall 181b of the cylinder body 181 for the purpose of connecting the first hydraulic oil pipe 23. O-rings 185, 185 are mounted to the piston 182 for the purpose of sealing a gap between the cylinder bore 181a and the piston 182. A deaeration plug 186 is provided for releasing air having mixed into the oil inside the cylinder body 181.

The piston 182 is provided with a rod insertion hole 182a in which to insert one end of the push rod 25.

The clutch 11 is of the multiple disk type, including a large driven gear 195 which is rotatably mounted to a main shaft 193 constituting a transmission 190 and which is meshed with a gear on the crankshaft side with a drive member 197 attached to the large driven gear 195 through a coil spring 196. Clutch disks 198 are provided as a plurality of frictional disks which are movable in the axial direction of the main shaft 193 and which are engaged with the inner peripheral surface of the drive member 197 in a rotating direction with a plurality of clutch plates 201 alternately overlapped with the clutch disks 198. A driven member 202 is spline connected to the main shaft 193 and on which the inner peripheral surfaces of the clutch plates 201 are movable in the axial direction of the main shaft 193 and are engaged in the rotating direction. A pushing member 204 is attached to the driven member 202 through a plurality of coil springs 203 and which pushes the driven member 202 through the pluralities of clutch disks 198 and clutch plates 201. An input member 211 is disposed on the pushing member 204 through a bearing 209, movably mounted to an end part of the main shaft 193 and is provided with a rod insertion hole 211a in which to insert the other end part of the push rod 25.

A plurality of bolts 212 are provided by which the coil spring 203 provided for pressing the pushing member 204 against the driven member 202 is attached to the driven member 202. A nut 213 is provided for attaching the driven member 202 to the main shaft 193.

The transmission 190 has a configuration in which the main shaft 193 is rotatably mounted on a housing 215 through bearings 216, 217, and a counter shaft (not shown) is rotatably mounted on the housing 215 through a pair of bearings.

A drive gear train 218 including a plurality of drive gears is spline connected onto the main shaft 193 so as to be movable in the axial direction, a driven gear trail including a plurality of driven gears is spline connected onto the counter shaft, the gears of the driven gear train are meshed with the gears of the drive gears 218, and a gear for power transmission is selected by a transmission mechanism (not shown).

As illustrated in FIG. 1, the first master cylinder 31, the first hydraulic oil pipe 23 and the first release cylinder 24 are component parts constituting the first hydraulic oil passage 231 for connecting/disconnecting the clutch 11, whereas the second master cylinder 132, the second hydraulic oil pipe 26 and the second release cylinder 32 are component parts constituting the second hydraulic oil passage 232.

The operation of the clutch hydraulic mechanism 10 as above will be described below.

Figure 8:
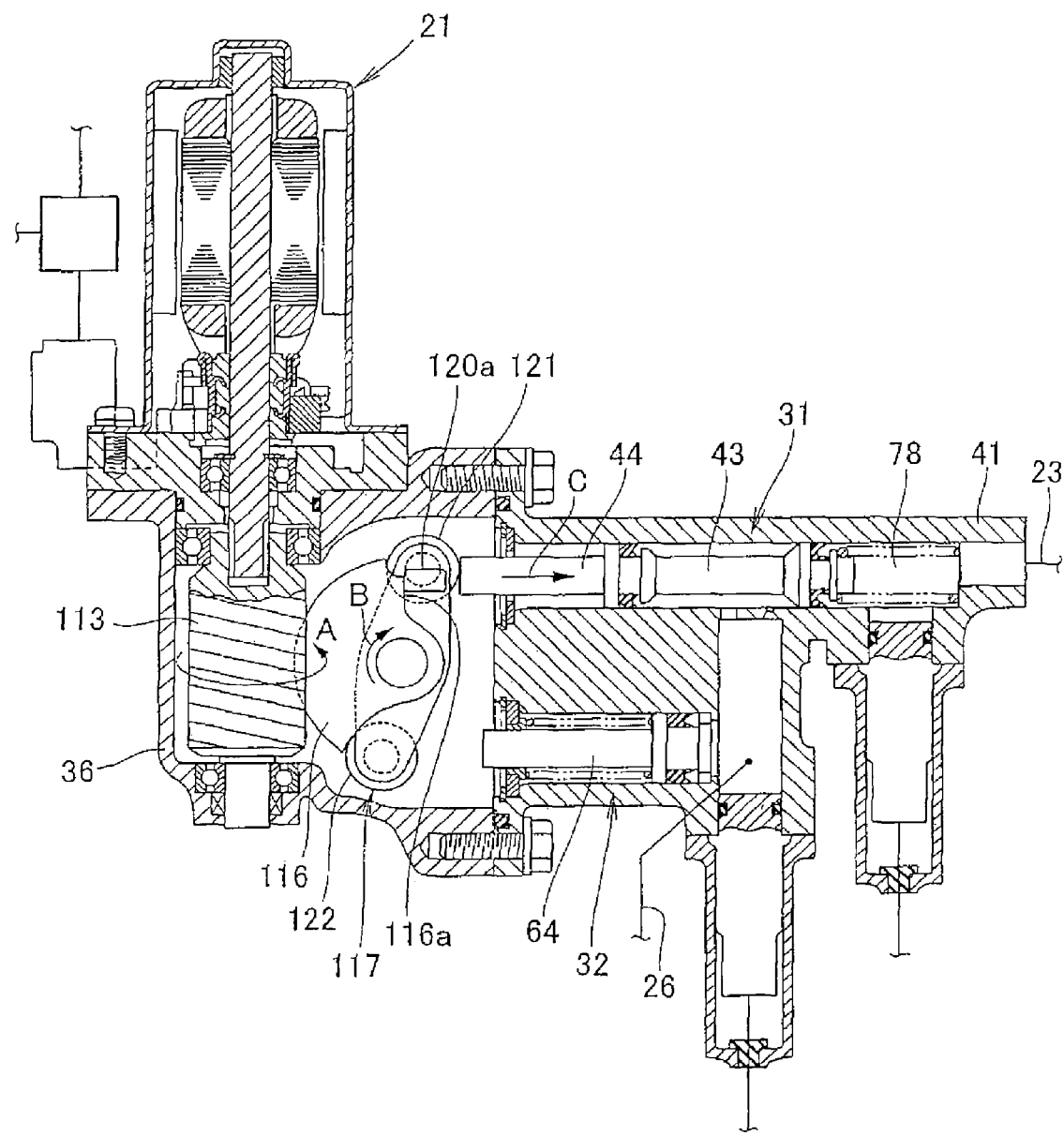
FIG. 8 is a first operation view showing an operation of the clutch hydraulic mechanism according to the present invention.

FIG. 8 is a first operational view showing an operation of the clutch hydraulic mechanism according to the present invention.

In FIG. 8, when a current is supplied to the electric motor 21 starting from the condition of FIG. 2, the worm 113 is rotated in the direction of arrow A, whereby the worm wheel 116 is rotated in the direction of arrow B. In this instance, the end surface 116a of the worm wheel 116 pushes the protrusion 120a of the see-saw member 117, so that the see-saw member 117 is also rotated together with the worm wheel 116, and the first roller 121 of the see-saw member 117 pushes out the rod 44 of the first master cylinder 31 in the direction of arrow C.

In this way, the piston 43 is moved together with the rod 44, to raise the hydraulic pressure inside the oil chamber 78. The hydraulic pressure is transmitted through the first hydraulic oil pipe 23 to the oil chamber 181A in the cylinder body 181 of the first release cylinder 24 shown in FIG. 7, to raise the hydraulic pressure inside the oil chamber 181A, so that the piston 182 pushes the push rod 25, and the push rod 25 is thereby moved toward the side of the clutch 11.

As a result, through the function of the bearing 209, the pushing member 204 is separated from the clutch disk 198 against the elastic force of the coil spring 203, the pushing force for pressing the clutch disks 198 and the clutch plates 201 against each other is substantially eliminated, whereby the clutch 11 is disconnected, i.e., no motive power is transmitted from the drive member 197 to the driven member 202.

In this instance, in FIG. 8, the second roller 122 of the see-saw member 117 is spaced away from the rod 64 of the second release cylinder 32, so that the operation of the electric motor 21 does not affect the clutch lever 14 (see FIG. 1) side (i.e., the second hydraulic oil passage 232).

Figure 9:
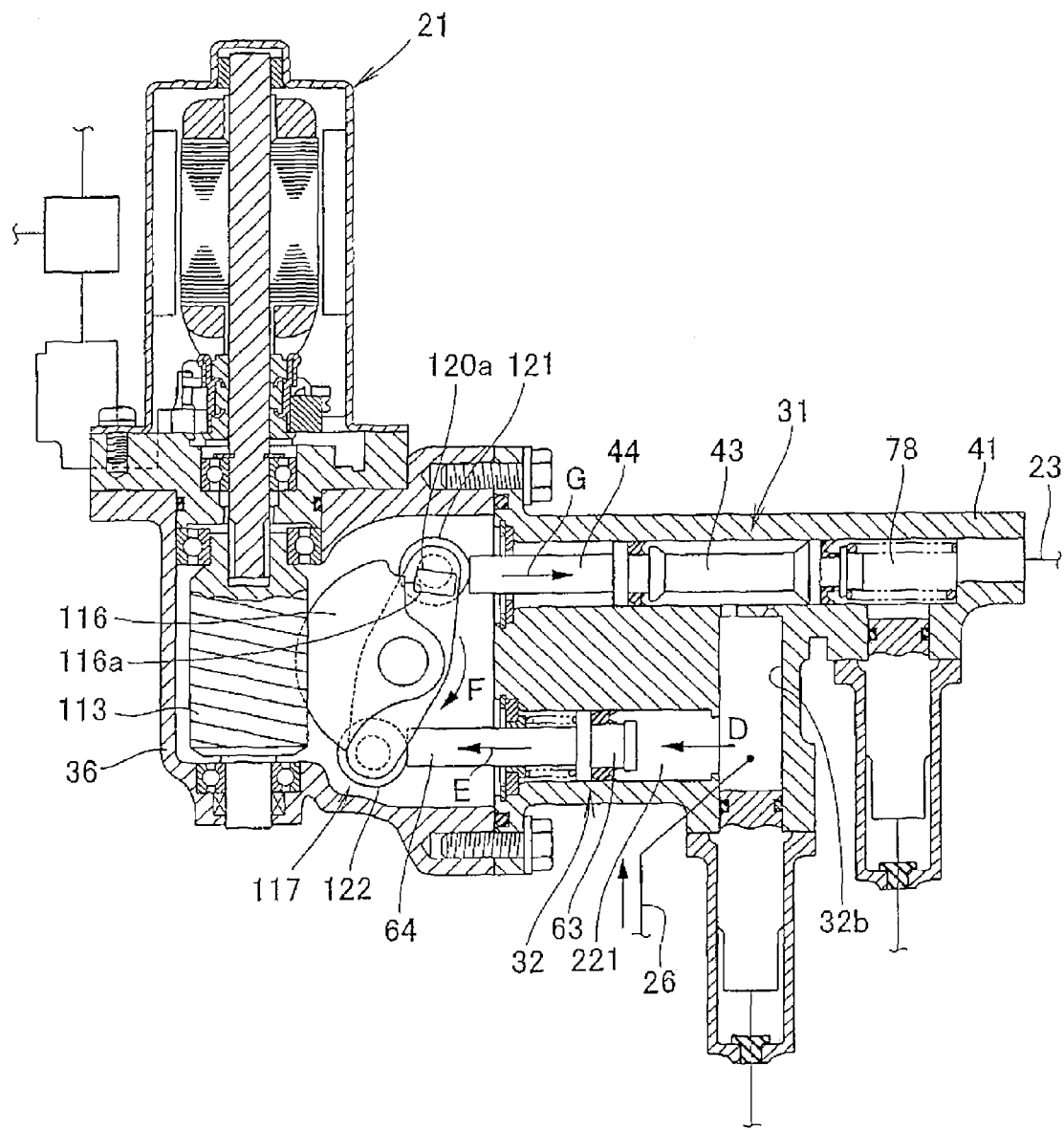
FIG. 9 is a second operation view showing an operation of the clutch hydraulic mechanism according to the present invention.

FIG. 9 is a second operational view showing an operation of the clutch hydraulic mechanism according to the present invention.

For example, when the clutch lever 14 in FIG. 3 is operated to move the piston 142 in the second master cylinder 132 leftward in FIG. 3 to thereby raise the hydraulic pressure inside the oil chamber 156, starting from the condition where the electric motor 21 is operated as shown in FIG. 8, the hydraulic pressure thus raised is transmitted through the second hydraulic oil pipe 26 to the second communicating hole 32b as shown in FIG. 9, and is transmitted from the second communicating hole 32b to the oil chamber 221 in the second release cylinder 32 as indicated by arrow D, so that the piston 63 and the rod 64 are moved in the direction of arrow E, and the rod 64 pushes the second roller 122 of the see-saw member 117.

As a result, the see-saw member 117 is rotated in the direction of arrow F, and the first roller 121 moves the rod 44 of the first master cylinder 31 in the direction of arrow G, so that the piston 43 is also moved, to raise the hydraulic pressure inside the oil chamber 78. The hydraulic pressure thus raised is transmitted through the first hydraulic oil pipe 23 to the oil chamber 181A in the cylinder body 181 of the first release cylinder 24 shown in FIG. 7, in the same manner as discussed above. Therefore, the push rod 25 is moved toward the side of the clutch 11, whereby the clutch 11 is disconnected.

In this instance, in FIG. 9, the protrusion 120a of the see-saw member 117 is separated from the end surface 116a of the worm wheel 116, so that the operation of the clutch lever 14 (see FIG. 3) does not affect the operation on the electric motor 21 side.

In this manner, the system on the electric motor 21 side and the system on the clutch lever 14 side can be operated independently.

As has been shown in FIGS. 2, 8 and 9, in the present invention, the see-saw member 117 is capable of power transmission with the piston 43 as a first master piston provided in the first master cylinder 31 and with the piston 63 as a second release piston provided in the second release cylinder 32, a part of the worm wheel 116 is capable of making contact with the see-saw member 117, and the worm 113 attached to the rotary shaft 81 of the electric motor 21 is meshed with the worm wheel 116. Therefore, it is possible by driving the electric motor 21 to operate the see-saw member 117 through the worm 113 and the worm wheel 116, and it is possible by manually driving the second release cylinder 32 to operate the see-saw member 117 independently from the system on the electric motor 21 side.

Figure 10A:
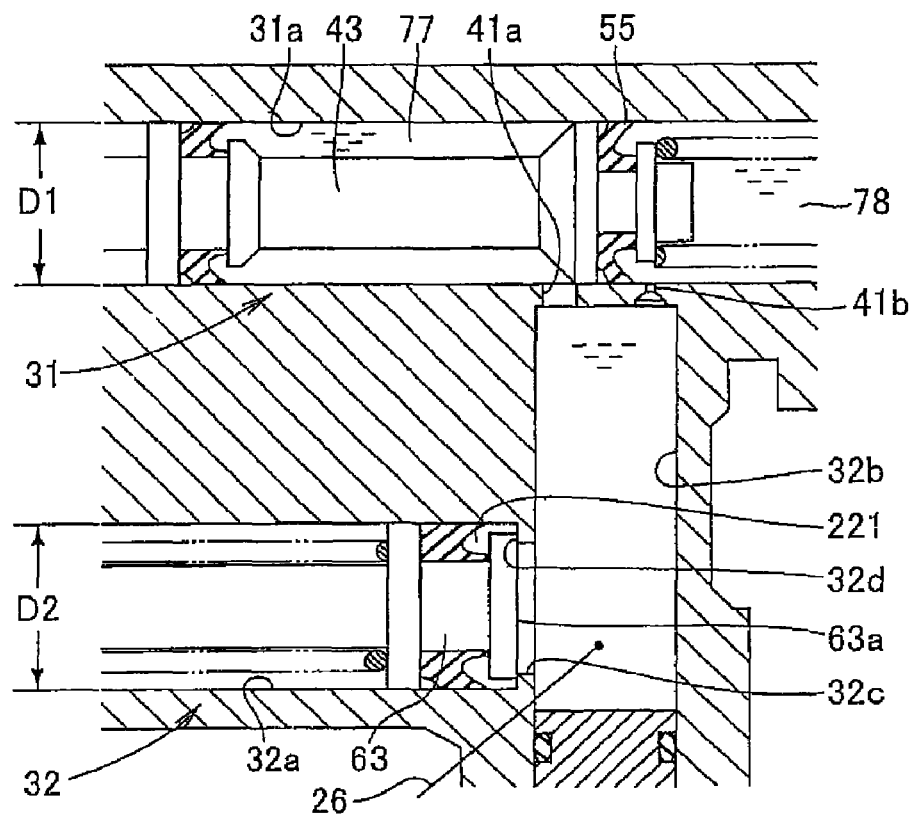
FIGS. 10(a) and 10(b) are third operational views showing an operation of the clutch hydraulic mechanism according to the present invention.
Figure 10B:
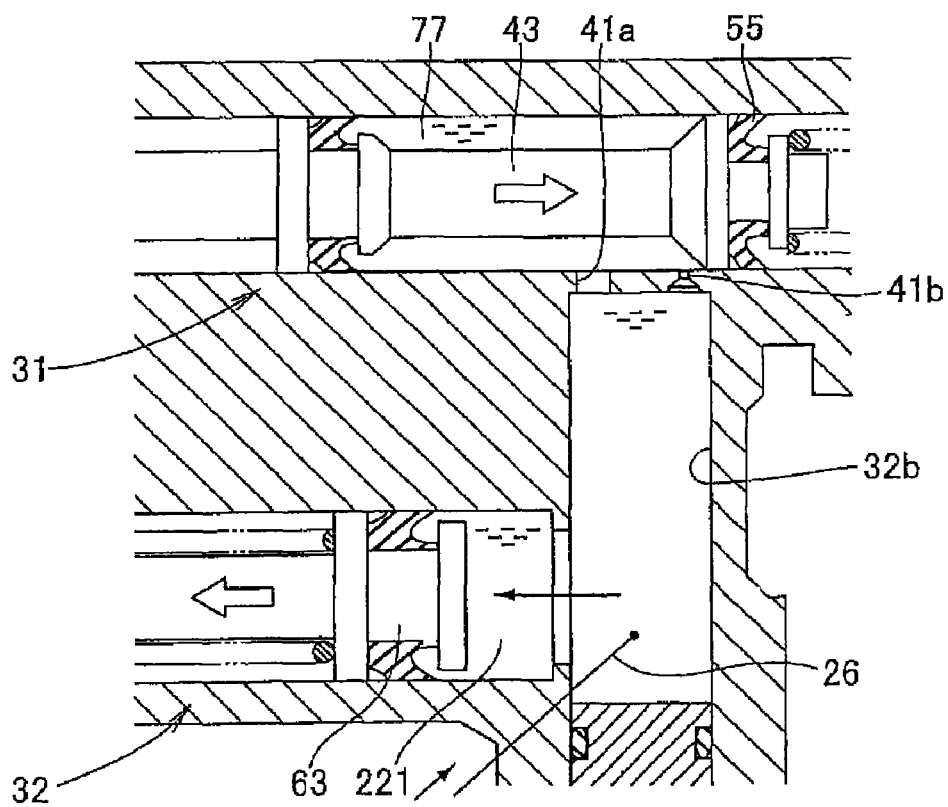

FIGS. 10(a) and 10(b) are third operational views showing an operation of the clutch hydraulic mechanism according to the present invention.

FIG. 10(a) shows the condition before movement of the piston 43 in the first master cylinder 31, i.e., the condition of the first master cylinder 31 and the second release cylinder 32 shown in FIG. 2.

More specifically, the primary cup 55 of the first master cylinder 31 is located between the large diameter hole 41a and the small diameter hole 41b. In addition, the end face 63a of the piston 63 in the second release cylinder 32 is abutting on the stepped part 32d.

When hydraulic pressure is transmitted to the second communicating hole 32b in this condition, the hydraulic pressure acts on the piston 43 from the right side through the small diameter hole 41b and the oil chamber 78, on the side of the first master cylinder 31. In addition, on the side of the second release cylinder 32, the hydraulic pressure acts on the piston 63 from the right side through the communication port 32c and the oil chamber 221.

Since the inner diameter D2 of the second cylinder bore 32a is larger than the inner diameter D1 of the first cylinder bore 31a, the pressure-receiving area of the piston 63 in the second release cylinder 32 is greater than the pressure-receiving area of the piston 43 in the first master cylinder 31, so that the force for moving the piston 63 leftwards is stronger than the force for moving the piston 43 leftwards. Therefore, the piston 63 is moved to the left, and the piston 43 is moved to the right.

In FIG. 10(b), when the piston 43 is moved to the right as indicated by a void arrow and the primary cup 55 is located on the right side relative to the small diameter hole 41b, both the large diameter hole 41a and the small diameter hole 41b front on the oil chamber 77, so that a force for moving the piston 43 is not generated, and only a force for moving the piston 63 by the hydraulic pressure acting on the oil chamber 221 of the second release cylinder 32 is generated.

As has been shown in FIGS. 2, 10(a) and 10(b) above, in the present invention, the first master cylinder 31 is disposed above the second release cylinder 32, so that air having mixed into the oil in the second release cylinder 32 is moved into the first master cylinder 31 on the upper side, whereby deaeration can be easily carried out.

In addition, with the second hydraulic oil pipe 26 connected to the second communicating hole 32b located on the lower side of the first master cylinder 31, air having mixed into the oil in the second hydraulic oil pipe 26 can be easily released into the first master cylinder 31 through the second communicating hole 32b, the large diameter hole 41a and the small diameter hole 41b on the upper side, whereby the deaeration work can be efficiently performed.

Furthermore, since the vehicle is a saddle ride type vehicle in the present invention, it is possible, by providing the first master cylinder 31 and the second release cylinder 32 of the saddle ride type vehicle in an integral form, to render the first master cylinder 31 and the second release cylinder 32 close to each other and compact, and to effectively utilize the body space in the saddle ride type vehicle in which to dispose the clutch hydraulic mechanism 10 (see FIG. 1).

In addition, while the axis 31A and the axis 32A are disposed in the same plane 179 and parallel to each other as shown in FIG. 6 in the present embodiment, this configuration is not limitative. The axis 31A and the axis 32A may not necessarily be parallel to each other insofar as the axes are present in the same plane.

In addition, while the hydraulic mechanism including a clutch has been described in the present embodiment, the hydraulic mechanism may be adopted for any hydraulic mechanism used in a vehicle, such as a brake using hydraulic pressure.

The clutch hydraulic mechanism according to the present invention is suited to use for a saddle ride type vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic mechanism for a vehicle comprising:
a first hydraulic oil passage including a first master cylinder for generating hydraulic pressure;
a first release cylinder supplied with hydraulic pressure from said first master cylinder through a first oil pipe for operating an object member;
a second hydraulic oil passage including a second master cylinder for generating hydraulic pressure; and
a second release cylinder for generating hydraulic pressure in said first master cylinder according to hydraulic pressure transmitted thereto from said second master cylinder through a second oil pipe;
wherein a power transmission member for transmitting motive power is provided between said second release cylinder and said first master cylinder, and
said first master cylinder and said second release cylinder are formed with separate cylinder axes in a common cylinder block,
wherein said power transmission member is capable of transmission of motive power by making direct contact with a first master piston provided in said first master cylinder and with a second release piston provided in said second release cylinder;
a part of a worm wheel is operatively connected with said power transmission member; and
said worm wheel is meshed with a worm attached to a rotary shaft of an electric motor.

2. The hydraulic mechanism for a vehicle according to claim 1,
wherein said first master cylinder is a clutch master cylinder for generating hydraulic pressure according to motive power given thereto;
said first release cylinder is a clutch release cylinder to which hydraulic pressure is transmitted from said clutch master cylinder through said first oil pipe and which disengages a clutch;
said second master cylinder is a manual master cylinder manually operated to generate hydraulic pressure; and
said second release cylinder is a manual release cylinder for generating hydraulic pressure in said clutch master cylinder according to hydraulic pressure transmitted thereto from said manual master cylinder through said second oil pipe.

3. The hydraulic mechanism for a vehicle according to claim 2, wherein the respective cylinder axes of said first master cylinder and said second release cylinder are disposed in parallel to each other.

4. The hydraulic mechanism for a vehicle according to claim 2, wherein said first oil pipe extends between only said first master cylinder and said first release cylinder, and
said second pipe extends only between said second master cylinder and said second release cylinder.

5. The hydraulic mechanism for a vehicle according to claim 2, wherein said cylinder block is provided therein with respective cylinder bores of said first master cylinder and said second release cylinder by machining from a single direction.

6. The hydraulic mechanism for a vehicle according to claim 1, wherein the respective cylinder axes of said first master cylinder and said second release cylinder are disposed on a single plane.

7. The hydraulic mechanism for a vehicle according to claim 6, wherein said cylinder block is provided therein with respective cylinder bores of said first master cylinder and said second release cylinder by machining from a single direction.

8. The hydraulic mechanism for a vehicle according to claim 1, wherein the respective cylinder axes of said first master cylinder and said second release cylinder are disposed in parallel to each other.

9. The hydraulic mechanism for a vehicle according to claim 1, wherein power transmission member includes a see-saw body.

10. The hydraulic mechanism for a vehicle according to claim 9, wherein said power transmission member includes a first roller and a second roller mounted on opposite ends of the see-saw body,
the first roller being capable of applying a force to move a first master piston in the first master cylinder, and
the second being capable of applying a force to move a second release piston in the second release cylinder.

11. The hydraulic mechanism for a vehicle according to claim 1, wherein said cylinder block is made by casting an aluminum alloy.

12. The hydraulic mechanism for a vehicle according to claim 1, wherein said cylinder block is provided therein with respective cylinder bores of said first master cylinder and said second release cylinder by machining from a single direction.

13. The hydraulic mechanism for a vehicle according to claim 1, wherein said first master cylinder is disposed above said second release cylinder, and
wherein the cylinder axes first master cylinder and said second release cylinder and are parallel to each other and perpendicular to a rotational axis of the power transmission member.

14. The hydraulic mechanism for a vehicle according to claim 1, wherein said worm is disposed to be on a lower side of said electric motor.

15. The hydraulic mechanism for a vehicle according to claim 1, and further comprising:
a first pressure sensor for detecting the pressure in said first oil pipe; and
a second pressure sensor for detecting the pressure in said second oil pipe;
wherein said first pressure sensor and said second pressure sensor are attached to a lower side of said cylinder block.

16. The hydraulic mechanism for a vehicle according to claim 1, wherein said vehicle is a saddle ride type vehicle.

17. A hydraulic mechanism for a vehicle comprising:
a first hydraulic oil passage including a first master cylinder for generating hydraulic pressure;
a first release cylinder supplied with hydraulic pressure from said first master cylinder through a first oil pipe for operating an object member;
a second hydraulic oil passage including a second master cylinder for generating hydraulic pressure; and
a second release cylinder for generating hydraulic pressure in said first master cylinder according to hydraulic pressure transmitted thereto from said second master cylinder through a second oil pipe;
wherein a power transmission member for transmitting motive power is provided between said second release cylinder and said first master cylinder, and
said first master cylinder and said second release cylinder are formed with separate cylinder axes, wherein said power transmission member includes a first and second roller; a first roller and a second roller, the first roller being capable of applying a force to move a first master piston in the first master cylinder, and the second roller being capable of applying a force to move a second release piston in the second release cylinder, wherein said power transmission member is capable of transmission of motive power by making direct contact with a first master piston provided in said first master cylinder and with a second release piston provided in said second release cylinder;

a part of a worm wheel is operatively connected with said power transmission member; and said worm wheel is meshed with a worm attached to a rotary shaft of an electric motor.

18. The hydraulic mechanism for a vehicle according to claim 17, wherein the first oil pipe extends only between said first master cylinder and said first release cylinder, and further comprising:

a second oil pipe which extends only between said second master cylinder and said second release cylinder.

* * * * *